(12) United States Patent
Chretien

(10) Patent No.: US 9,168,494 B2
(45) Date of Patent: Oct. 27, 2015

(54) UNIT FOR ESTABLISHING CONTACT BETWEEN A GAS AND A LIQUID FOR A FLOATING PLATFORM

(75) Inventor: Denis Chretien, Paris (FR)

(73) Assignee: TOTAL S.A., Courbevoie (FR)

( * ) Notice: Subject to any disclaimer, the term of this patent is extended or adjusted under 35 U.S.C. 154(b) by 234 days.

(21) Appl. No.: 13/878,683

(22) PCT Filed: Oct. 10, 2011

(86) PCT No.: PCT/IB2011/054463
§ 371 (c)(1),
(2), (4) Date: Apr. 10, 2013

(87) PCT Pub. No.: WO2012/049615
PCT Pub. Date: Apr. 19, 2012

(65) Prior Publication Data
US 2013/0204066 A1    Aug. 8, 2013

(30) Foreign Application Priority Data
Oct. 11, 2010    (FR) ...................................... 10 58250

(51) Int. Cl.
*B01F 3/04*    (2006.01)
*B01D 3/00*    (2006.01)
(Continued)

(52) U.S. Cl.
CPC . *B01F 3/04* (2013.01); *B01D 3/008* (2013.01); *B01D 3/16* (2013.01); *B01D 53/18* (2013.01); *B01D 53/185* (2013.01); *B01D 53/263* (2013.01); *E21B 43/34* (2013.01); *F25J 3/0295* (2013.01); *B01D 2252/204* (2013.01); *B01D 2252/2025* (2013.01); *B01D 2257/304* (2013.01); *B01D 2257/504* (2013.01); *B01D 2257/80* (2013.01); *F25J 2200/90* (2013.01); *F25J 2290/72* (2013.01)

(58) Field of Classification Search
CPC .......... B01D 3/008; B01D 3/16; B01D 53/18; B01D 53/185; B01D 53/263; B01D 2252/2025; B01D 2252/204; B01D 2257/304; B01D 2257/504; B01D 2257/80; B01F 3/04; E21B 43/34; F25J 3/0295; F25J 2200/90; F25J 2290/72
USPC .......................................... 261/97, 110, 112.1
See application file for complete search history.

(56) References Cited

U.S. PATENT DOCUMENTS 2,394,133 A * 2/1946 Zimmerman .................. 261/110
4,472,325 A * 9/1984 Robbins .......................... 261/96
(Continued)

FOREIGN PATENT DOCUMENTS

FR    2928719 A1    9/2009
FR    2957140 A1    9/2011
(Continued)

*Primary Examiner* — Charles Bushey
*Assistant Examiner* — Scott Bushey
(74) *Attorney, Agent, or Firm* — Harness, Dickey & Pierce, P.L.C.

(57) ABSTRACT

A unit for establishing contact between a liquid and a gas includes: a chamber having a vertical axis; a first series of contact sections disposed along the length of the vertical axis of the chamber; a second series of contact sections disposed along the length of the vertical axis of the chamber, alternated with the contact sections of the first series; and a liquid circulation system designed to circulate a liquid in the contact sections of the first series and in the contact sections of the second series in a separate manner.

19 Claims, 4 Drawing Sheets

(51) Int. Cl.
  *B01D 3/16* (2006.01)
  *B01D 53/18* (2006.01)
  *E21B 43/34* (2006.01)
  *F25J 3/02* (2006.01)
  *B01D 53/26* (2006.01)

(56) References Cited

U.S. PATENT DOCUMENTS

| | | | |
|---|---|---|---|
| 6,149,136 A * | 11/2000 | Armstrong et al. | 261/19 |
| 6,286,818 B1 * | 9/2001 | Buhlmann | 261/97 |
| 6,395,138 B1 * | 5/2002 | Darredeau et al. | 202/158 |
| 6,397,630 B1 | 6/2002 | Fraysse et al. | |
| 6,907,751 B2 | 6/2005 | Kalbassi et al. | |
| 8,118,284 B2 | 2/2012 | Alzner et al. | |
| 2004/0020238 A1 * | 2/2004 | Kalbassi et al. | 62/617 |
| 2006/0244159 A1 * | 11/2006 | White et al. | 261/94 |

FOREIGN PATENT DOCUMENTS

| | | |
|---|---|---|
| FR | 2957141 A1 | 9/2011 |
| WO | WO-2012066460 A2 | 5/2012 |

* cited by examiner

UNIT FOR ESTABLISHING CONTACT BETWEEN A GAS AND A LIQUID FOR A FLOATING PLATFORM

CROSS-REFERENCE TO RELATED APPLICATIONS

This application is a National Phase Entry of International Application No. PCT/IB2011/054463, filed on Oct. 10, 2011, which claims priority to French Patent Application Serial No. 1058250, filed on Oct. 11, 2010, both of which are incorporated by reference herein.

TECHNICAL FIELD

The invention relates to a unit (of the column type) for establishing contact between a liquid and a gas, particularly suitable for use on a floating platform. The aim is to limit the effects of the movement of the floating platform on the effectiveness of the gas-liquid contact. The invention particularly applies to washing natural gas using a basic solution so as to extract the acid compounds (carbon dioxide and hydrogen sulfide) therefrom. It also applies to drying gas by contact between the gas and a hygroscopic liquid such as triethylene glycol (TEG) or diethylene glycol (DEG), as well as columns for regenerating those liquids. It may also be applied to hydrocarbon distillation.

BACKGROUND

Offshore hydrocarbon exploitation leads to the use of various treatment methods on oil platforms. However, when the sea is too deep, it is not possible to use stationary platforms, and floating platforms, often called FPSO (Floating Production Storage and Off-loading), are used. These floating platforms are subject to the movements of the sea, which they transmit to the equipment they bear. Among these, the columns, whether distillation or absorber columns, are among the most sensitive to movement. In fact, the effectiveness of this equipment depends on the quality of the contact between the descending liquid and the vapor that rises in the columns.

The most traditional method for establishing good contact between the liquid and vapor consists of forcing the gas to pass through ports formed in a tray on which the liquid flows. However, in such tray columns, the quality of the contact between the liquid and vapor depends on the horizontally of the trays; any angle relative to the horizontal, even a small one, can lead to dry a part of the tray from liquid, which then no longer ensures contact between the liquid and vapor. For that reason, operators of plants on floating platforms prefer random or structured packing over trays. Document FR 2777533 describes a floating maritime structure having a structured packing with a particular geometry designed to reduce the impact of the marine oscillations on the operation of the structure.

Random packing consists of metal or ceramic pieces that are positioned so as to fill the entire cross-section of the column, in a disordered manner. The complex shape ensures good contact between the liquid and the vapor. Structured packing consists of plates shaped and arranged together so as to ensure the passage of the gas and liquid with good contact.

FIG. 1 shows a traditional column arrangement equipped with packing. The configuration is similar for disordered packing and structured packing. The column here comprises two packing beds A and B. They are sprayed with liquid using distributors C and D that ensure the distribution thereof on the entire cross-section of the column. A collector E collects the liquid from the bed A; the liquid is then distributed by the distributor D on the bed B. The proper operation of the packing assumes that the liquid is regularly distributed over the entire cross-section of the column so as to avoid dry areas, which would cause part of the rising vapor not to be in contact with the liquid.

In traditional liquid distributors, the liquid coming from the top of the column arrives in a chute, the bottom of which is pierced with holes. Each of these holes is across from a secondary chute that it feeds with liquid. The secondary chutes, the bottoms of which are in turn pierced with distribution holes, ensure uniform spraying of the cross-section of the column.

Furthermore, in traditional liquid distributors, the chutes are open at the apex and the liquid level established inside is also subject to the movements of the FPSO. As a result, depending on the incline, the distribution holes are covered by a higher or lower liquid level. Since the flow rate through each hole depends on the liquid height submerging it, the flow rates are therefore not identical, which leads to irregular spraying of the cross-section of the column. Certain distribution ports may not be submerged in the liquid, which leads to dry areas in the packing. The liquid/vapor contact quality is therefore affected.

Document US 2008/0271983 proposes to modify the liquid distributor so as to ensure a regular distribution of the liquid over the entire cross-section of the column, irrespective of the incline. An illustration thereof is provided in FIG. 2, taken from that document.

The liquid is distributed on the cross-section of the column using primary 32 and secondary 33 chutes which, unlike traditional distributors, are closed. Each primary chute 32 is supplied by a vertical tube 31. The chutes are pierced on the lower surface thereof with ports that ensure the distribution of the liquid, whereof the diameter is calculated such that the liquid level is established relatively high in the vertical tube 31. Thus, the pressure differences that may appear at the perpendicular to each of the ports due to the incline of the column become negligible faced with the hydrostatic height produced by the liquid level in the vertical tube 31. A uniform distribution of the liquid may thus be ensured over the entire cross-section of the column. These distributors are described as pressure distributors.

However, the main drawback of this device lies in the height of liquid that is necessary in the vertical tube 31. In fact, for the device to be effective, this height must be significantly greater than the height variations between the different parts of the chutes that result from the incline of the column. The height of the vertical tube 31 therefore commonly reaches 3 to 4 m.

Furthermore, when the column is inclined, the liquid tends, within the packing, to accumulate on the side toward which the column is tilted, until it may encounter the shell on which it flows without returning toward the inside of the packing. The uniformity of the liquid distribution obtained using the pressurized distributor is thus broken. In order to avoid this harmful effect, it is necessary to collect the liquid and redistribute it approximately every 4 to 5 m so as to eliminate the edge effects.

As a result of the above, the height of a column following the model of that described in document US 2008/0271983 is significantly greater than a standard column, with an equal flow rate. This results in bulk and weight constraints that are difficult to reconcile with the constraints of a tight environment, such as that of floating platforms. Consequently, there is a need to design a new unit for establishing contact between a gas and a liquid that is capable of operating effectively on a floating platform despite the movements thereof, and having smaller sizes than the units of the state of the art.

SUMMARY

The invention first relates to a unit for establishing contact between a liquid and a gas, comprising:
- a chamber having a vertical axis;
- a first series of contact sections positioned along the length of the vertical axis of the chamber;
- a second series of contact sections positioned along the length of the vertical axis of the chamber, alternated with the contact sections of the first series;
- a liquid circulation system adapted for circulating a liquid in the contact sections of the first series and in the contact sections of the second series in a separate manner.

According to one embodiment, each contact section comprises a liquid distribution system, a liquid collection system, and packing positioned between the liquid distribution system and the liquid collection system. According to one embodiment, the packing is of the structured or random type. According to one embodiment, the unit comprises connecting ducts adapted for conveying the liquid between the successive contact sections of the first series on the one hand, and between the successive contact sections of the second series on the other hand.

According to one embodiment, the connecting ducts between the contact sections of the first series pass through the contact sections of the second series; and the connecting ducts between the contact sections of the second series pass through the contact sections of the first series. According to one embodiment, the connecting ducts are at least partially arranged outside the chamber. According to one embodiment, the unit comprises:
- a first liquid intake duct feeding a contact section of the first series;
- a second liquid intake duct feeding a contact section of the second series;
- liquid collection means at a lower end of the chamber.

According to one embodiment, the unit comprises:
- a single gas intake duct at a lower end of the chamber;
- a single gas collection duct at an upper end of the chamber.

According to one embodiment, the unit is a distillation unit or a drying unit for a gaseous mixture or a deacidification unit for a gaseous mixture, and preferably is a hydrocarbon distillation unit or a natural gas drying unit or a natural gas deacidification unit.

The invention also relates to a method for establishing contact between a liquid and a gas, comprising feeding a unit as described above with gas and liquid, and optionally collecting gas and liquid coming from the unit. According to one embodiment, this method is a method for deacidifying a gaseous mixture, in which the gas feeding the unit is preferably natural gas and the liquid feeding the unit is a basic solution, preferably comprising an amine compound. According to another embodiment, this method is a method for drying a gaseous mixture, in which the gas feeding the unit is preferably natural gas and the liquid feeding the unit is a hygroscopic liquid, preferably comprising a glycol compound. According to another embodiment, this method is a hydrocarbon distillation method. According to one embodiment, this method is implemented offshore using a floating platform.

The present invention makes it possible to overcome the drawbacks of the state of the art. It more particularly provides a unit for establishing contact between a gas and a liquid capable of working effectively on a floating platform (despite the movements thereof) and which may be smaller than the devices of the state of the art (and in particular those described in document US 2008/0271983). This is accomplished owing to an alternating arrangement of packing beds and distributors feeding them, so as to use the entire available volume of the column.

DETAILED DESCRIPTION

Figure 3:
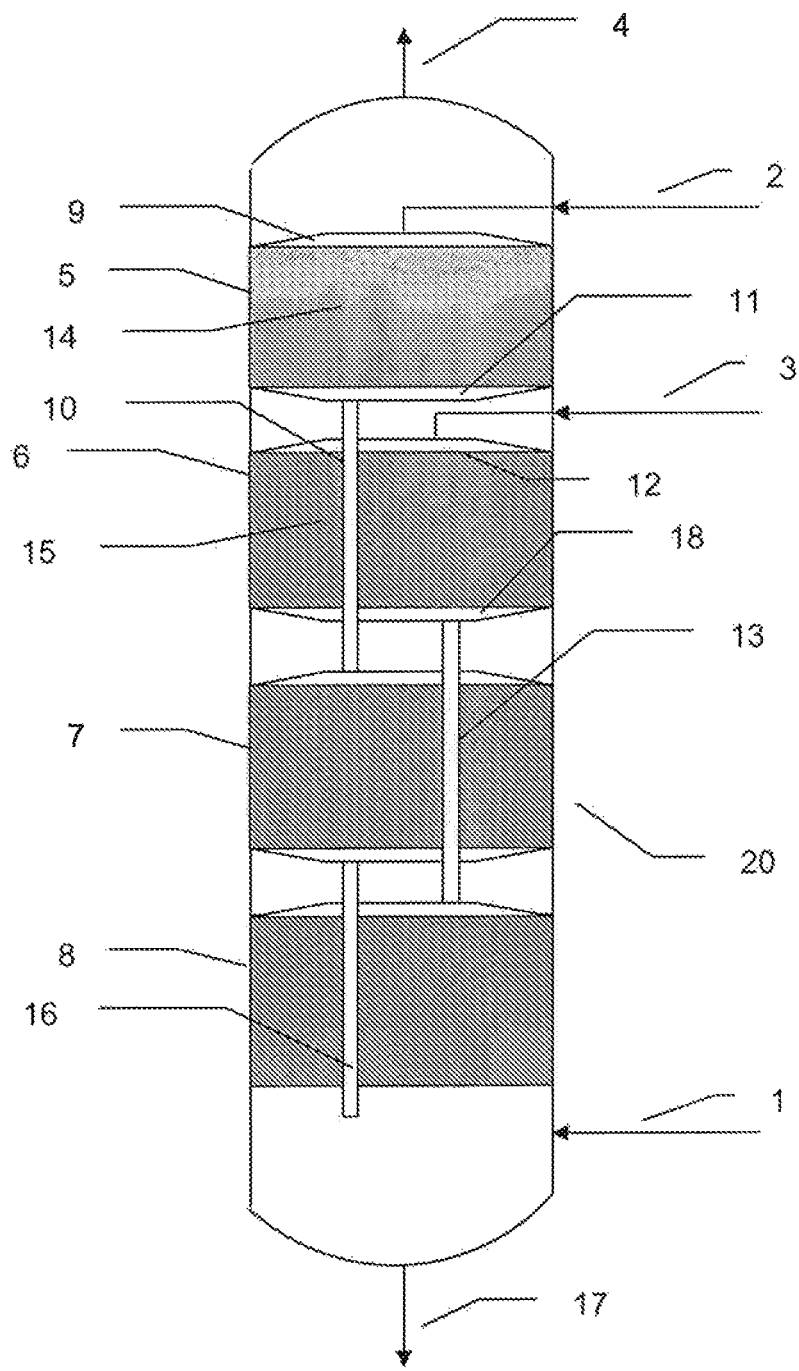
FIG. 3 diagrammatically shows one embodiment of a unit according to the invention.

The invention is now described in more detail and non-limitingly in the following description. A first embodiment is illustrated in FIG. 3. This embodiment preferably relates to a wash column with a solution with a base of an amine compound, to purify acid gases (primarily carbon dioxide and hydrogen sulfide) contained in natural gas. Preferably, the column is a countercurrent column.

The column comprises a chamber 20 (or shell) defining a vertical axis. For example, the chamber 20 may be essentially cylindrical. The natural gas to be treated feeds the column at the base thereof through a gas intake duct 1. The liquid (lean or regenerated amine solution) is introduced at the head of the column through a first liquid intake duct 2 and a second liquid intake duct 3. The flow rate of each of these feeds is reduced by approximately half relative to the single feed used in the state of the art. The purified gas is recovered at the apex of the column by a gas collection duct 4.

Contact sections 5, 6, 7, 8 are positioned along the vertical axis of the column. Each contact section 5, 6, 7, 8 is adapted for promoting contact between the gas and the liquid, and therefore comprises a packing bed 14, 15 (which may be a structured or random packing). A distinction is made between a first series of contact sections 5, 7 and a second series of contact sections 6, 8, the two series being positioned alternating. Thus, any contact section adjacent to a contact section of the first series belongs to the second series; and likewise, any contact section adjacent to a contact section of the second series belongs to the first series.

In the illustrated example, from the head of the column toward the base, are successively arranged: a first contact section 5 of the first series, a first contact section 6 of the second series, a second contact section 7 of the first series, and lastly a second contact section 8 of the second series. The total number of contact sections maybe even or odd. There are at least three contact sections in all (in which case, one of the series comprises only one contact section, surrounded by two contact sections of the other series). Advantageously, the total number of contact sections may be set at 4 or 5.

The liquid is distributed at the head of each contact section 5, 6, 7, 8 by a liquid distribution system 9, 12, and collected at the base of each contact section 5, 6 by a liquid collection system 11, 18. The unit is provided such that the liquid circulates separately (or independently) in the column on the one hand in the contact sections 5, 7 of the first series, and on the other hand in the contact sections 6, 8 of the second series. Connecting ducts 10, 13 allow circulation of the liquid between two successive contact sections within each series. In other words, there is no exchange of liquid between the first series and the second series.

More specifically, in the illustrated situation, the first liquid intake duct 2 feeds the distribution system 9 of the first contact section 5 of the first series. At the base of that contact section 5, the amine solution is collected in the collection system 11 of the first contact section 5 of the first series, it is conveyed in the first connecting duct 10 of the first series, and it feeds the distribution system of the second contact section 7 of the first series. The same means are repeated similarly if the first series includes a third contact section or several successive contact sections.

Likewise, still in the illustrated situation, the second liquid intake duct 3 feeds the distribution system 12 of the first contact section 6 of the second series. At the base of that contact section 6, the amine solution is collected in the collection system 18 of the first contact section 6 of the second series, it is conveyed in the first connecting duct 13 of the second series, and it feeds the distribution system of the second contact section 8 of the second series. The same means are repeated similarly if the second series includes a third contact section or several successive contact sections.

Figure 1:
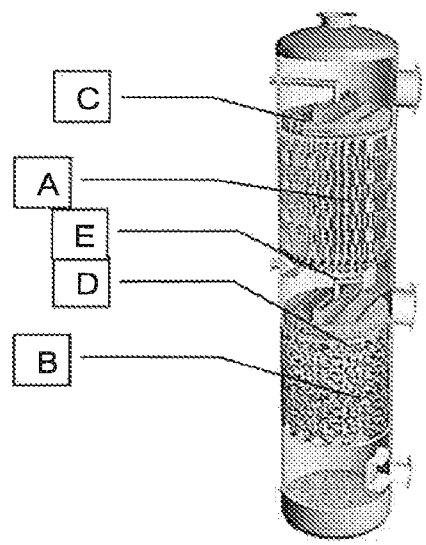
FIG. 1 diagrammatically shows a traditional packing contactor (state of the art).
Figure 2:
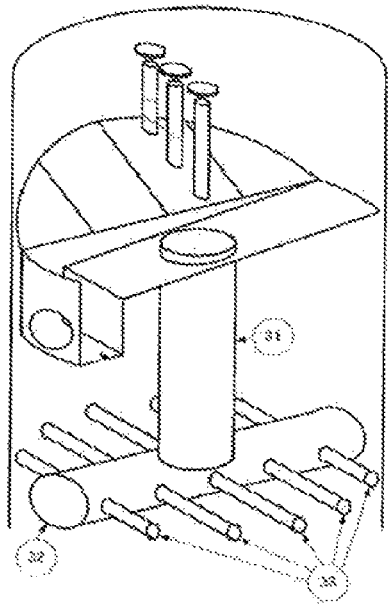
FIG. 2 diagrammatically shows a detail of a contactor for a floating platform according to the state of the art (document US 2008/0271983).

The assembly consisting of a connecting duct and a distribution system that it feeds is advantageously similar to the liquid distribution equipment described above relative to FIG. 2, and which is described in more detail in document US 2008/0271983. In particular, advantageously, the connecting duct is a tube or hose closed over its entire circumference, and the liquid distribution system comprises a set of hoses whereof the entire circumference is closed, with the exception only of ports designed for liquid to exit toward the packing (and connections between hoses).

With the arrangement described above, the liquid between the first contact section 5 of the first series and the second contact section 7 of the first series (just as, in the illustrated case, between the first contact section 6 of the second series and the second contact section 8 of the second series) does not go through the packing bed of the contact section 6 (7, respectively) situated between those contact sections. In this way, it is possible both to:

- avoid any loss of space in the unit, by minimizing spaces not occupied by packing and which are therefore not dedicated to liquid/gas contact strictly speaking; and
- benefit from a sufficient hydrostatic pressure in each distribution system (owing to the connecting ducts) to prevent any distribution heterogeneity with the overall movements of the unit.

The vertical dimension of the connecting ducts 10, 13 is adapted such that the height differences that may appear between the ends of the distribution systems 9, 12 when the column is inclined are negligible relative to said vertical dimension of the connecting ducts 10, 13. For example, the connecting ducts may have a dimension larger than 1 m, or 2 m, or 3 m, or 4 m, in the vertical direction; and/or may be adapted to contain a volume of liquid having a dimension in the vertical direction greater than or equal to 1 m, or 2 m, or 3 m, or 4 m. It therefore appears that the unit according to the invention allows a uniform feeding of the packing beds using pressurized distributors positioned alternating with the packing beds.

At the base of the column, the amine solution from the two series of contact sections 5, 6, 7, 8 can be recovered in a single liquid collection duct 17. The amine solution is then sent to a regeneration device. The single liquid collection duct 17 is supplied on the one hand with liquid coming directly from the contact section situated closest to the base (in the illustrated case, this is the second contact section 8 of the second series), and on the other hand by the liquid from the immediately adjacent contact section (in the illustrated case, this is the second contact section 7 of the first series), which is recovered using a last connecting duct 16.

According to another embodiment not shown, the amine solution from the first series of contact sections 5, 7 is recovered at the base of the column by a first liquid collection duct, while the amine solution from the second series of contact sections 6, 8 is recovered at the base of the column by a second liquid collection duct. The amine solutions recovered in these two liquid collection ducts have different purities. There is therefore an energy gain if they are introduced into the regeneration device separately at different levels. This embodiment assumes the presence of one flash drum by liquid collection duct. It is thus possible to partially offset the increased vapor consumption related to the increase of the amine solution flow rate.

Still in reference to FIG. 3, each connecting duct 10, 13, 16 (between the successive contact sections within each series, and at the output of the next-to-last contact section of the column) passes through the following contact section (i.e., the adjacent contact section, at the base of the contact section from which it came). When two connecting ducts are present on the same altitude of the column (for example, the connecting ducts 10, 13 between the collection system 18 of the first contact section 6 of the second series and the distribution system of the second contact section 7 of the first series), the design of the distribution and collection systems may be such that these connecting ducts are coaxial to the center of the column.

Figure 4:
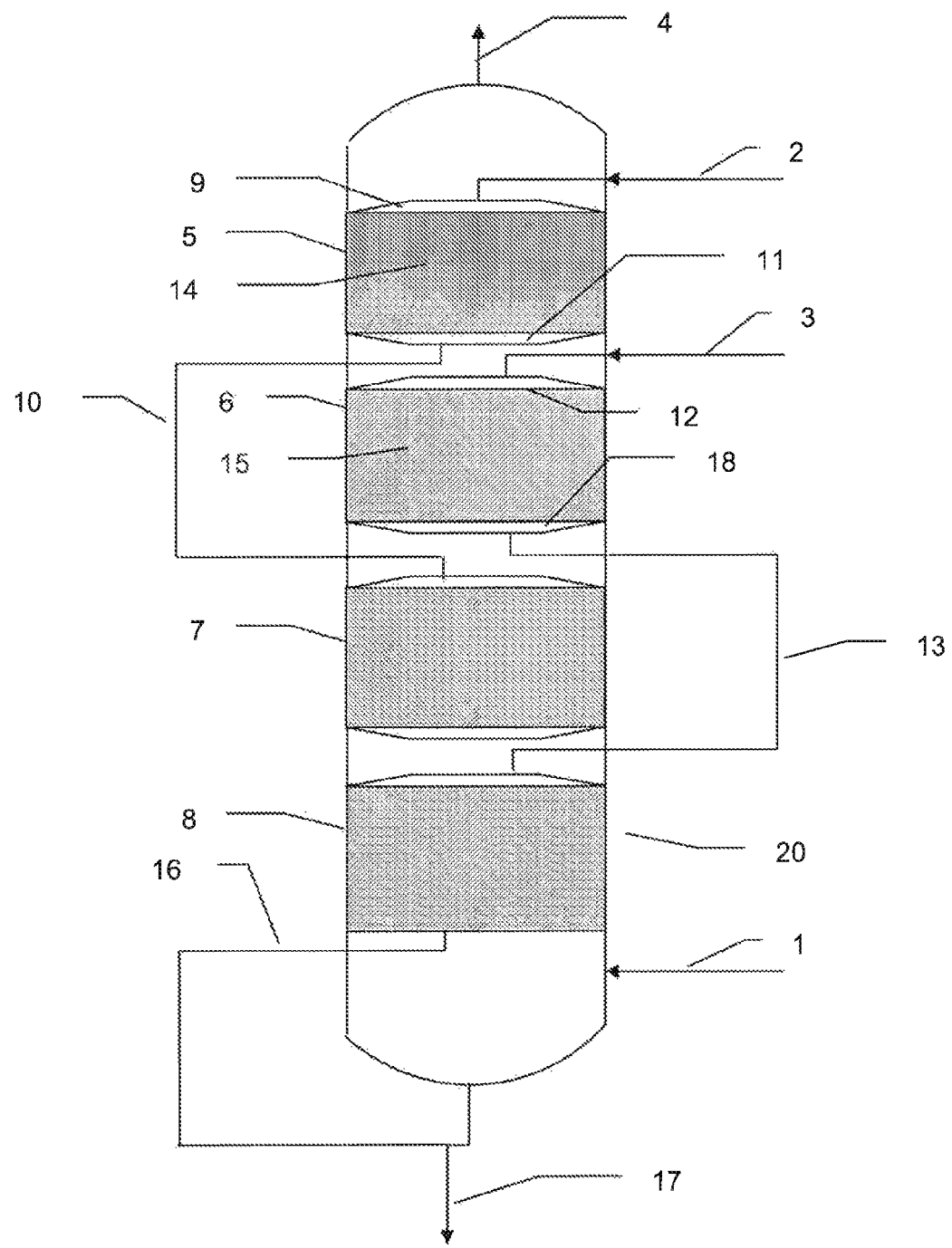
FIG. 4 diagrammatically shows another embodiment of the unit according to the invention.

According to another embodiment shown in FIG. 4 (where the references bear the same meaning as above), each connecting duct 10, 13, 16 bypasses the following contact section, for example by being positioned at least partially outside the chamber 20. The embodiment of FIG. 3 makes it possible to use traditional chambers and is therefore more practical in terms of boilers working and tubing. Conversely, the embodiment of FIG. 4 makes it possible to use traditional packing beds and to preserve a maximal cross-section for the packing.

It is possible to provide a feed using two amine solutions with different purities (in the respective liquid intake ducts 2, 3), which is advantageous if one wishes to perform a relatively shallow purification of the gas. This unit has been described for an absorption column with an amine solution, but it is also possible to provide any other type of column, for example a gas-glycol contactor for drying the gas, a condensate stabilization column, or a distillation column. If applicable, the unit is provided with additional means so as to be able to perform the appropriate function, for example heating means and/or cooling means.

EXAMPLE

In the following example, the aim is to extract the carbon dioxide contained in natural gas. The composition of the natural gas is as follows:

| COMPONENT | MOLAR % |
| --- | --- |
| Carbon dioxide | 10.04 |
| Nitrogen | 0.03 |
| Water | 0.14 |
| Methane | 81.69 |

| COMPONENT | MOLAR % |
|---|---|
| Ethane | 5.53 |
| Propane | 1.65 |
| i-butane | 0.28 |
| n-butane | 0.31 |
| Pentane + | 0.47 |

The content to be achieved at the head of the column for the purified gas is 50 ppm vol of carbon dioxide in the gas. The natural gas flow rate at the inlet of the column is 19626 kmol/h.

Figure 5:
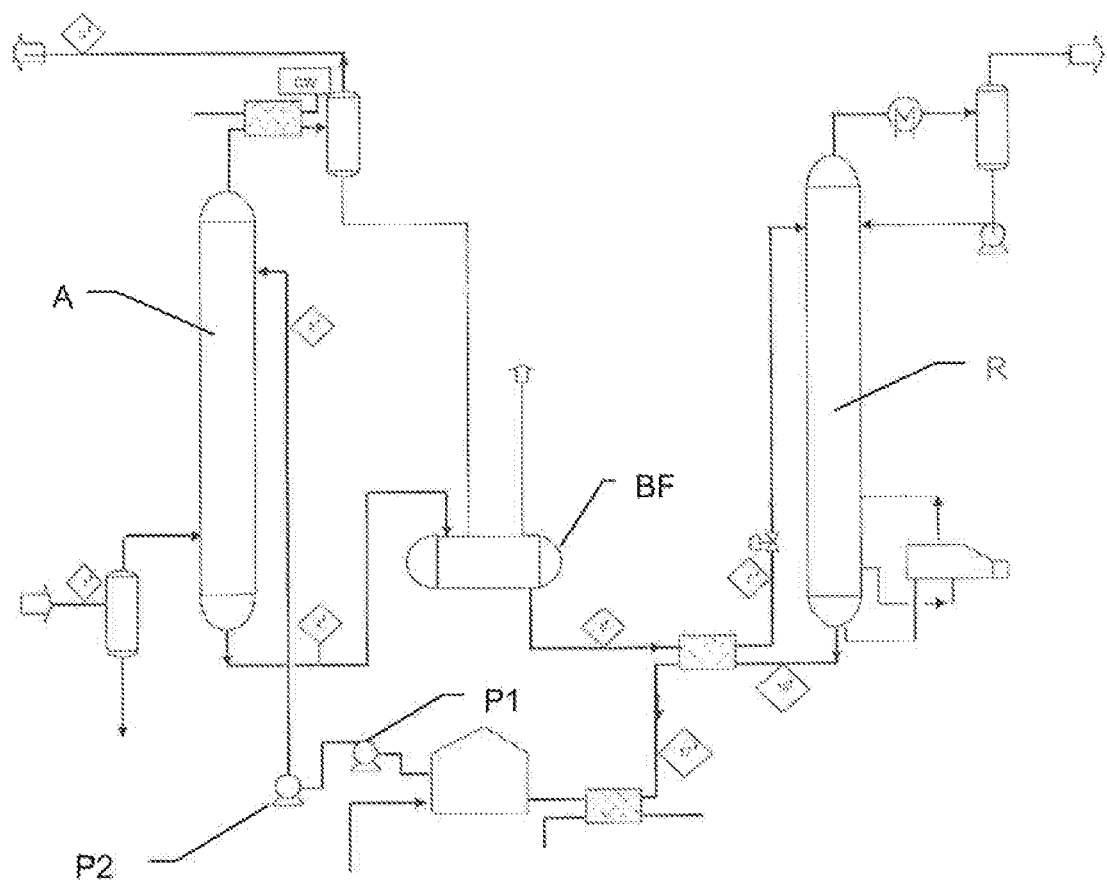
FIG. 5 diagrammatically shows a natural gas deacidification unit.

FIG. 5 diagrammatically shows an extraction unit for extracting acid gas from the natural gas. The natural gas containing acid gas 1' enters the absorber A. It is washed therein at countercurrent by the regenerated amine solution, which is introduced in 2'. The purified gas exits in 3'. The amine solution charged with acid gases leaves the absorber in 4', and is expanded and degassed in the extraction drum BF. It is then heated from 6' to 7', then enters the regeneration column R. It exits purified of acid gases in 16', is successively cooled from 16' to 18', pumped by the pumps P1 and P2 up to the pressure of the absorber A, and the cycle begins again.

In FIG. 5, the feeding of the absorber with the amine solution is done only at the head, according to the state of the art. The distributors are those pressurized distributors described in document US 2008/0271983, with a hydrostatic height of approximately 4 m. The flow rate of the amine solution 2' is 1048 t/h.

If the absorber A is now replaced with the unit according to the invention, the flow rate of amine solution 2' is divided into two identical portions that feed the absorber A separately (through the ducts 2 and 3 of FIG. 3 or 4). Subsequently, the gas is treated in the intermediate contact section 6 using a purer solution than in the configuration of the state of the art, but the final purity in the upper contact section 5 is only ensured by a portion of the flow rate. As a result, these two factors act at counter purposes, and the total flow rate is increased up to 1415 t/h, or 707.5 t/h for each of the feeds.

The corollary to the increase in the total amine solution flow rate is an increase in the size of the regeneration equipment (the flash drum BF and the regeneration column R). However, the impact of this size increase on the total weight of the amine wash unit remains limited, as the regeneration equipment operates at low pressure.

However, the diameter of absorber is most often determined by the liquid solution flow rate that descends along the column. Since the amine flow rate is divided in two, it follows that each bed is only passed through by 707.5 t/h instead of 1048 t/h in the case of the state of the art. The diameter of the high-pressure absorber is thus reduced. Lastly, using the volume left empty by the distributor of the state of the art makes it possible to decrease the height of the absorber.

The dimensions and weights of the equipment are summarized in the tables below:

State of the Art:

|  | Diameter (mm) | Height (mm) | Weight (t) |
|---|---|---|---|
| Absorber | 3400 | 41100 | 729 |
| Flash drum | 3200 | 9700 | 55 |
| Regenerator | 4400 | 26500 | 268 |

Invention:

|  | Diameter (mm) | Height (mm) | Weight (t) |
|---|---|---|---|
| Absorber | 3100 | 34000 | 504 |
| Flash drum | 3500 | 10500 | 73 |
| Regenerator | 4700 | 26500 | 303 |

The invention therefore shows a total mass gain of 172 t. However, the mass gain on the absorber, which is the heaviest and most difficult piece of equipment to install, is 225 t. This results in a more balanced distribution of the masses between the various modules of the floating platform and easier production of the assembly. Furthermore, the mass gains are calculated relative to the treatment equipment alone. They do not include the structure supporting them, the mass of which is approximately twice that of the equipment. The total gain is therefore approximately 700 t for the module bearing the absorber and 500 t for the amine wash unit assembly, given the increase in the mass of the regeneration equipment.

The invention claimed is:

1. A unit for establishing contact between a liquid and a gas, comprising:
    a chamber having a vertical axis;
    a first series of contact sections positioned along the length of the vertical axis of the chamber;
    a second series of contact sections positioned along the length of the vertical axis of the chamber, alternated with the contact sections of the first series; and
    a liquid circulation system adapted for circulating a liquid in the contact sections of the first series and in the contact sections of the second series in a separate manner.

2. The unit according to claim 1, wherein each contact section comprises a liquid distribution system, a liquid collection system, and a packing positioned between the liquid distribution system and the liquid collection system.

3. The unit according to claim 1, wherein the packing is of the structured or random type.

4. The unit according to claim 1, comprising connecting ducts adapted for conveying the liquid between the successive contact sections of the first series on the one hand, and between the successive contact sections of the second series on the other hand.

5. The unit according to claim 4, wherein the connecting ducts between the contact sections of the first series pass through the contact sections of the second series, and the connecting ducts between the contact sections of the second series pass through the contact sections of the first series.

6. The unit according to claim 1, comprising:
    a first liquid intake duct feeding a contact section of the first series;
    a second liquid intake duct feeding a contact section of the second series; and
    a liquid collector at a lower end of the chamber.

7. The unit according to claim 1, comprising:
    a single gas intake duct at a lower end of the chamber; and
    a single gas collection duct at an upper end of the chamber.

8. The unit according to claim 1, which is a distillation unit or a drying unit for a gaseous mixture or a deacidification unit for a gaseous mixture.

9. A unit for establishing contact between a liquid and a gas, comprising:
    a chamber having a substantially vertical axis;
    a first series of contact sections positioned along the length of the substantially vertical axis of the chamber;

a second series of contact sections positioned along the length of the substantially vertical axis of the chamber, alternated with the contact sections of the first series;

a liquid circulation system adapted for circulating a liquid in the contact sections of the first series and in the contact sections of the second series in a separate manner; and connecting ducts adapted for conveying the liquid between the successive contact sections of the first series on the one hand, and between the successive contact sections of the second series on the other hand, wherein the connecting ducts are at least partially arranged outside the chamber.

10. The unit according to claim 9, wherein each contact section comprises a liquid distribution system, a liquid collection system, and packing positioned between the liquid distribution system and the liquid collection system.

11. The unit according to claim 9, wherein the packing is of the structured or random type.

12. The unit according to claim 9, wherein the connecting ducts between the contact sections of the first series pass through the contact sections of the second series, and the connecting ducts between the contact sections of the second series pass through the contact sections of the first series.

13. The unit according to claim 9, comprising:
a first liquid intake duct feeding a contact section of the first series;
a second liquid intake duct feeding a contact section of the second series; and
a liquid collector at a lower end of the chamber.

14. The unit according to claim 9, comprising:
a single gas intake duct at a lower end of the chamber; and
a single gas collection duct at an upper end of the chamber.

15. The unit according to claim 9, which is at least one of: a hydrocarbon distillation unit or a natural gas drying unit or a natural gas deacidification unit.

16. The unit according to claim 9, wherein the unit is a natural gas deacidification unit, the gas feeding the unit is natural gas, and the liquid feeding the unit is a basic solution comprising an amine compound.

17. The method unit according to claim 9, wherein the unit is a natural gas drying unit, the gas feeding the unit is natural gas, and the liquid feeding the unit is a hygroscopic liquid comprising a glycol compound.

18. The unit according to claim 9, further comprising an offshore floating platform supporting the chamber, the liquid circulation system, and the connecting ducts.

19. A unit for establishing contact between a liquid and a gas, comprising:

a chamber;

a first series of contact sections disposed within the chamber including a first contact section and a second contact section, each of the first and second contact sections of the first series comprising a packing bed for promoting contact between the liquid and the gas, the first contact section of the first series being positioned above the second contact section of the first series;

a second series of contact sections disposed within the chamber including a first contact section and a second contact section, each of the first and second contact sections of the second series comprising a packing bed for promoting contact between the liquid and the gas, the first contact section of the second series being positioned between the first and second contact sections of the first series, the second contact section of the second series being positioned below the second contact section of the first series;

a first liquid distribution system disposed in fluid communication with the first contact section of the first series for supplying a first flow of the liquid to the first contact section of the first series;

a second liquid distribution system disposed in fluid communication with the first contact section of the second series for supplying a second flow of the liquid to the first contact section of the second series;

a first connecting duct extending between the first contact section of the first series and the second contact section of the first series for conveying the liquid in the first flow from the first contact section of the first series to the second contact section of the first series in fluid isolation from the first and second contact sections of the second series; and a second connecting duct extending between the first contact section of the second series and the second contact section of the second series for conveying the liquid in the second flow from the first contact section of the second series to the second contact section of the second series in fluid isolation from the first and second contact sections of the first series.

* * * * *